2,989,868
SQUARE ROOTING MECHANISM
Albert J. Rosenberger, Chicago, Ill., assignor, by mesne assignments, to Republic Flow Meter Company, Chicago, Ill., a corporation of Delaware
Filed Apr. 23, 1956, Ser. No. 580,102
10 Claims. (Cl. 73—407)

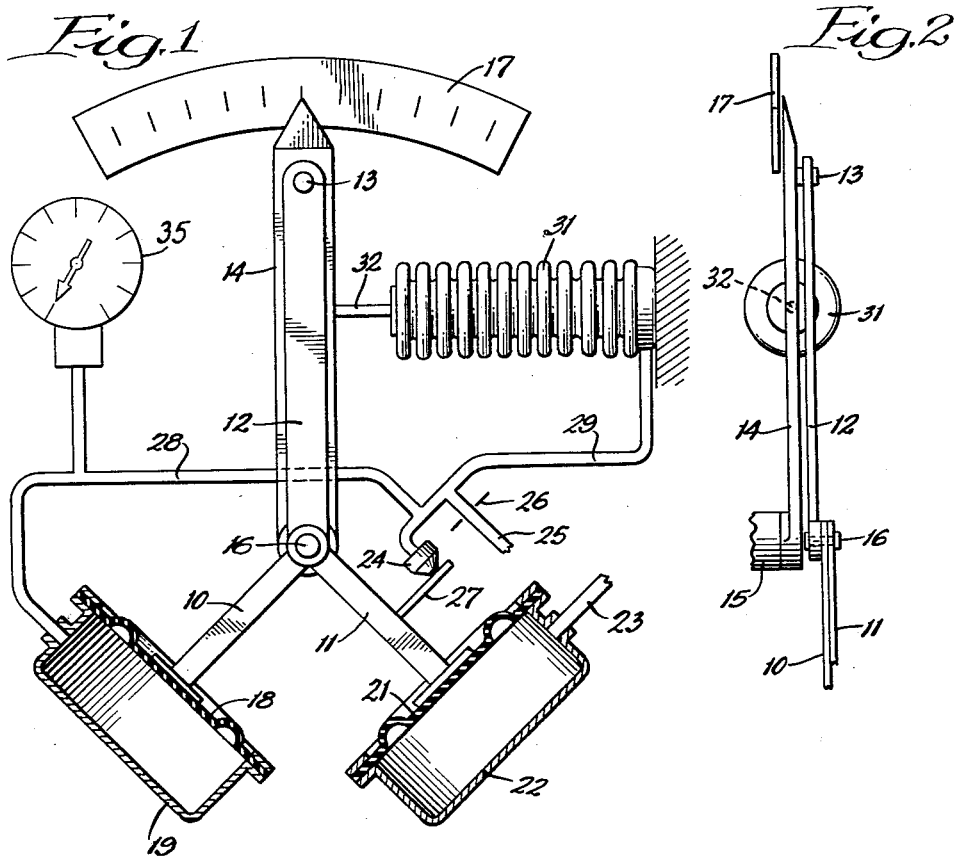

This invention relates to square rooting mechanisms and more particularly to a mechanism responsive to an input or control force to produce an output force approximately proportional to the square root of the input force. In measuring various conditions, such as fluid flow, by the drop across an orifice the result as measured in fluid pressure or other force is proportional to the square of the condition. It is highly desirable for indicating and for various controlling operations to extract the square root of the measured force and the primary object of the present invention is to provide a square rooting mechanism for this purpose which is simple in construction and which functions rapidly and effectively within a commercial range of accuracy to extract directly the square root of a force indicative of a value of a condition.

Another object is to provide a square rooting mechanism in which an input force and a regulated force are balanced against each other with the regulated force being controlled by unbalance and acting to change the mechanical advantage relationship of the forces.

According to one feature of the invention, the forces are applied to links at an acute angle to each other and are balanced by a reaction link and the regulated force operates means to change the angle of the reaction link relative to the first two links thereby to change the mechanical advantage between them.

According to another feature, the forces are in the form of fluid pressures acting on diaphragms and the angle of the reaction link is controlled by a pressure responsive motor responsive to the regulated pressure.

The above and other objects and features of the invention will be more readily apparent from the following description when read in connection with the accompanying drawing, in which:

FIGURE 1 is a diagrammatic view with parts in section of a square rooting mechanism embodying the invention; and FIGURE 2 is a side view with parts broken away.

The apparatus as shown is substantially similar to that more particularly described and claimed in my copending application Serial No. 444,085, filed July 19, 1954, modified to extract the square root of the input or controlling force. As shown, the apparatus comprises a linkage including links 10 and 11 on which the input or controlling force and the regulated force act longitudinally. The links 10 and 11 are pivotally interconnected at one end with a reaction link 12 which is supported for angular movement relative to the links 10 and 11 and the reaction link is pivoted at 13 adjacent its upper end to the free end of a supporting lever 14 which is in turn pivoted at its lower end on fixed mounting 15 coaxial with the pivoted interconnection between the links 10, 11 and 12, as shown at 16. The upper end of the supporting link 14 is movable over a scale 17 on which the square root of the controlling or input force may be indicated and observed.

To exert forces on the links 10 and 11 in the apparatus, as shown in FIGURE 1, fluid responsive diaphragms are employed. Thus, the link 10 is connected to a flexible diaphragm 18 which closes one side of a cup-shaped housing 19 so that the diaphragm will exert a force longitudinally of the link 10 which is proportional to the pressure within the housing 19. Similarly, the link 11 is connected to a flexible diaphragm 21 closing a housing 22 to which the input or controlling pressure is supplied through a pipe 23 so that the force on the link 11 will be proportional to the input or controlling pressure.

Unbalance of the forces exerted by the diaphragms 18 and 21 is utilized to produce a regulated force or pressure which acts on the diaphragm 18 and which also adjusts the angular position of the supporting link 14. For this purpose, a bleed nozzle 24 is mounted adjacent the linkage and is supplied with air or other fluid under pressure through a conduit 25 past a restriction 26. The nozzle 24 is variably restricted by a vane 27 which is supported by the linkage to approach and recede from the nozzle thereby to vary the nozzle restriction. As shown, the vane 27 is carried directly by the link 11 and the nozzle is mounted parallel to the link 11, although various other positions of the nozzle and vane could be utilized with the same effect.

The nozzle is connected through a pipe 28 to the housing 19 to act on the diaphragm 18 and is also connected through a pipe 29 to a fluid motor 31. As shown, the fluid motor 31 is in the form of an elongated expansible bellows fixedly mounted at one end and connected at its other end through a link 32 to the supporting link 14. In its relaxed position when not subjected to pressure the bellows will contract to move the link 14 and the reaction link 12 substantially into alignment with the link 10 and this position is the zero position of the apparatus. As the pressure behind the nozzle 24 increases, the bellows 31 will be expanded to move the supporting link 14 about its pivot 15 to a position proportional to the regulated pressure acting on the bellows.

In operation, assuming that the parts are in the zero position described above, when an input or controlling pressure is supplied through the pipe 23 it will act on the link 11 tending to shift it to the left so that the vane 27 will restrict the nozzle 24. With the supporting link 14 in alignment or substantially in alignment with the link 10, a relatively small pressure on the diaphragm 21 will tend to produce a relatively large movement and will require a relatively large pressure acting on the diaphragm 18 to rebalance the linkage due to the unfavorable mechanical advantage of the diaphragm 18 through the linkage. As the pressure increases and the supporting link 14 moves further to the left, the mechanical advantage of the diaphargm 18 through the linkage will increase so that a relatively smaller increase in the regulated pressure behind the nozzle 24 and a relatively smaller movement of the supporting link 14 is required to rebalance the same increment of force on the link 11. By properly proportioning the linkage and by arranging the links 10 and 11 at an acute angle substantially equal to a right angle, as shown, it has been found that the increase in the regulated force or pressure is related approximately according to the square root functions to increases in the input or controlling force or pressure. The regulated force or pressure and by the same token the angular position of the supporting link 14 can therefore be taken as a measure of the square root of the input force or pressure within the limits of commercial accuracy. In addition to acting on the diaphragm 18 and the fluid motor 31, the regulated force or pressure can be utilized to operate any desired type of indicating or control instruments such as is shown at 35 and constitutes force or pressure directly proportional to changes in the condition being measured, as represented by the input or controlling pressure 23.

While one embodiment of the invention has been shown and described herein, it will be understood that it is illustrative only and not to be taken as a definition of the scope of the invention, reference being had for this purpose to the appended claims.

What is claimed is:

1. A mechanism comprising a pair of force producing devices, a pair of links lying at an angle to each other and respectively connected to the force producing devices to have forces exerted thereon longitudinally of the links by the force producing devices, a reaction link pivotally interconnected at one end with the first named links, means mounting the other end of the reaction link for movement about a center coaxial with the pivotal interconnection with the first named links to change its angle relative to the first named links, means to apply a force to one of the force producing devices, means responsive to movement of the links to produce a regulated force, means to apply the regulated force to the other force producing device, and means responsive to the regulated force connected to the reaction link to move said other end of the reaction link.

2. A square rooting mechanism comprising a pair of force producing devices, a pair of links lying at an angle to each other and respectively connected to the force producing devices to have forces exerted thereon longitudinally of the links by the force producing devices, a reaction link pivotally interconnected at one end with the first named links, a supporting pivot for the other end of the reaction link, means mounting the supporting pivot for movement on an arc coaxial with the pivotal interconnection, means to apply a force whose square root is to be extracted to one of the force producing devices, means responsive to movement of the links to produce a regulated force, means to apply the regulated force to the other force producing device, and means responsive to the regulated force connected to the supporting pivot to move it.

3. A square rooting mechanism comprising a pair of force producing devices, a pair of links lying at an angle to each other and respectively connected to the force producing devices to have forces exerted thereon longitudinally of the links by the force producing devices, a reaction link pivotally interconnected at one end with the first named links, a supporting link pivoted at one end on a fixed pivot coaxial with the pivotal interconnection, the other end of the reaction link being pivoted on the free end of the supporting link, means to apply a force whose square root is to be extracted to one of the force producing devices, means responsive to movement of the links to produce a regulated force, means to apply the regulated force to the other force producing device, and means responsive to the regulated force connected to the supporting link to move it about the fixed pivot.

4. A square rooting mechanism comprising a pair of pressure responsive diaphragms, a pair of links lying at an angle to each other and respectively connected to the diaphragms to have forces exerted longitudinally thereon by the diaphragms, a reaction link pivotally interconnected at one end to the first named links, means mounting the other end of the reaction link for movement about a center coaxial with the pivotal interconnection, means to conduct a pressure whose square root is to be extracted to one of the diaphragms, valve means controlled by movement of the links to produce a regulated pressure, means to conduct the regulated pressure to the other diaphragm, and a pressure responsive motor responsive to the regulated pressure and connected to said means mounting the other end of the reaction link to move it and thereby to change the angle of the reaction link relative to the first named links.

5. A square rooting mechanism comprising a pair of pressure responsive diaphragms, a pair of links lying at an angle to each other and respectively connected to the diaphragms to have forces exerted longitudinally thereon by the diaphragms, a reaction link pivotally interconnected at one end to the first named links, a supporting link pivoted at one end on a fixed pivot coaxial with the pivotal interconnection, a pivotal connection between the other ends of the reaction and supporting links, means to conduct a pressure whose square root is to be extracted to one of the diaphragms, valve means controlled by movement of the links to produce a regulated pressure, means to conduct the regulated pressure to the other diaphragm, and a pressure responsive motor responsive to the regulated pressure and connected to the supporting link to move it about the fixed pivot.

6. In combination, a movable member, means for exerting a plurality of angularly related separately controlled forces on substantially a common point on said member, means for controlling said member to exert a force on said common point equal and opposite to the resultant of the forces exerted on said point by all of said force exerting means, and means responsive to the force exerted by one of said plurality of force exerting means for controlling the magnitude of the force exerted by at least a second one of said force exerting means and said member controlling means.

7. A mechanism comprising a pair of force producing devices, means responsive to the force produced by one of said pair for regulating the force produced by the other of said pair, links lying at an angle to each other and respectively connected to the force producing devices to have a force exerted thereon longitudinally of the links by the force producing devices, a reaction link pivotally interconnected at one end with the first named links, means mounting the other end of the reaction link for movement about a center coaxial with its pivotal interconnection with the first named links to change its angle relative to the first named links, and means controlled by said regulating means and connected to the reaction link to move said other end of the reaction link in a direction to rebalance the forces acting on the first named links.

8. A mechanism comprising a pair of force producing devices, means responsive to the force produced by one of said pair for regulating the force produced by the other of said pair, links lying at an angle to each other and respectively connected to the force producing devices to have a force exerted thereon longitudinally of the links by the force producing devices, a reaction link pivoted at one end on a supporting pivot and at its other end pivotally interconnected with the first named links, means mounting the supporting pivot for movement in an arc about the pivotal interconnection, and means controlled by said regulating means to shift the supporting pivot in a direction to rebalance the forces acting on the first named links.

9. A mechanism comprising a rotatable member pivoted about a first axis, a second member pivotally mounted on said rotatable member about an axis parallel to but displaced from said first axis, means for applying a plurality of forces normally angularly related to each other to a point on said second member which normally is coincident with said first axis, means responsive to displacement of said point on said second member from said coincidence due to variations in said forces for regulating the magnitude of at least a second of said forces, and means controlled by said responsive means for rotating said rotatable member about said first axis to tend to reestablish coincidence of the point on said second member with said first axis.

10. A mechanism comprising a rotatable member pivoted about a first axis, a second member pivotally mounted on said rotatable member about a second axis parallel to but displaced from said first axis, means for applying a plurality of forces normally in fixed angular relationship with respect to each other to a point on said second member proximate said first axis and normally lying in the plane of said axes, said forces exerting opposed turning moments on said second member about said second axis, means responsive to displacement of said point from said plane due to variations in said forces for regulating the magnitude of at least a second of said forces, and means controlled by said responsive means for rotating said rotatable member about said first axis to tend to re-establish said point in said plane.

References Cited in the file of this patent

UNITED STATES PATENTS

| | | |
|---|---|---|
| 2,352,312 | Donaldson | June 27, 1944 |
| 2,408,685 | Rosenberger | Oct. 1, 1946 |
| 2,427,235 | Smoot | Sept. 9, 1947 |
| 2,494,781 | Stover | Jan. 17, 1950 |
| 2,538,824 | Andresen | Jan. 23, 1951 |
| 2,608,051 | Nettel | Aug. 26, 1952 |
| 2,652,813 | Reuter | Sept. 22, 1953 |

FOREIGN PATENTS

| | | |
|---|---|---|
| 681,544 | Germany | Sept. 25, 1939 |